US009703509B2

United States Patent
Manning et al.

(10) Patent No.: US 9,703,509 B2
(45) Date of Patent: Jul. 11, 2017

(54) AUTHORIZING OR PRINTING NEGOTIABLE INSTRUMENT

(71) Applicant: Manning Ventures, Inc., Fairport, NY (US)

(72) Inventors: William Manning, Fairport, NY (US); Sanchit Sarin, Fairport, NY (US)

(73) Assignee: Manning Ventures, Inc., Fairport, NY (US)

( * ) Notice: Subject to any disclaimer, the term of this patent is extended or adjusted under 35 U.S.C. 154(b) by 0 days.

(21) Appl. No.: 14/784,988

(22) PCT Filed: Apr. 16, 2014

(86) PCT No.: PCT/US2014/034371
§ 371 (c)(1),
(2) Date: Oct. 16, 2015

(87) PCT Pub. No.: WO2014/172461
PCT Pub. Date: Oct. 23, 2014

(65) Prior Publication Data
US 2016/0092145 A1 Mar. 31, 2016

Related U.S. Application Data

(60) Provisional application No. 61/812,814, filed on Apr. 17, 2013.

(51) Int. Cl.
*G06F 3/12* (2006.01)
*G06Q 20/20* (2012.01)
(Continued)

(52) U.S. Cl.
CPC .......... *G06F 3/1222* (2013.01); *G06F 3/1238* (2013.01); *G06Q 20/042* (2013.01);
(Continued)

(58) Field of Classification Search
CPC ............. G06Q 20/382; G06Q 20/4012; G06Q 20/0855; G06Q 20/3674; G06Q 20/20;
(Continued)

(56) References Cited

U.S. PATENT DOCUMENTS 6,119,931 A * 9/2000 Novogrod ............... G07F 19/20
235/379
2002/0087463 A1 7/2002 Fitzgerald et al.
(Continued)

OTHER PUBLICATIONS

Korean Intellectual Property Office (/ISA/KR), International Search Report from PCT/US2014/034371 as completed Aug. 27, 2014 (3 pgs.).

*Primary Examiner* — Jamares Q Washington
(74) *Attorney, Agent, or Firm* — Barclay Damon, LLP

(57) ABSTRACT

A method of authorizing a negotiable instrument includes automatically receiving a request for the instrument, identity data identifying a requester, and a location of a requester. If the location is within location range for the identity data, a verification code is transmitted to the client. An input code is received from a personal mobile device at a location. If the input code matches the verification code and the device is near the requester, a reference code of the negotiable instrument is transmitted to the client and is stored. A method of performing a financial transaction indicated by the instrument includes automatically receiving the reference code, receiving identifying data of a bearer of the negotiable instrument; determining whether the received identifying data correspond to a request for the instrument; and, if so, producing a transaction record corresponding to the request and invalidating the reference code. Systems are also described.

7 Claims, 6 Drawing Sheets

(51) Int. Cl.
*G06Q 20/32* (2012.01)
*G06Q 20/38* (2012.01)
*G06Q 20/04* (2012.01)

(52) U.S. Cl.
CPC ............. *G06Q 20/20* (2013.01); *G06Q 20/32* (2013.01); *G06Q 20/3224* (2013.01); *G06Q 20/385* (2013.01)

(58) Field of Classification Search
CPC ... G06Q 20/32; G06Q 20/3224; H04W 12/00; G06F 3/1222; G06F 3/1238
USPC ....... 358/1.15, 1.14, 405; 705/64, 72, 78, 67
See application file for complete search history.

(56) References Cited

U.S. PATENT DOCUMENTS

| | | |
|---|---|---|
| 2003/0014368 A1 | 1/2003 | Leurig et al. |
| 2006/0190411 A1* | 8/2006 | Gava ...................... G06Q 10/10 705/64 |
| 2008/0114658 A1 | 5/2008 | Weitzman |
| 2012/0030113 A1 | 2/2012 | Mark et al. |
| 2013/0081101 A1 | 3/2013 | Baer et al. |

* cited by examiner

AUTHORIZING OR PRINTING NEGOTIABLE INSTRUMENT

CROSS-REFERENCE TO RELATED APPLICATIONS

This application claims the priority and benefit of U.S. Provisional Patent Application Ser. No. 61/812,814, filed Apr. 17, 2013, and entitled "NEGOTIABLE-INSTRUMENT PRINTING," the entirety of which is incorporated herein by reference.

FIELD OF THE INVENTION

The present application relates to printing negotiable instruments, and particularly to such printing occurring intermittently, periodically, or as needed.

BACKGROUND OF THE INVENTION

Negotiable instruments such as checks, money orders, cashier's checks, and traveler's checks are generally printed on specialized stationery or forms bearing pre-printed serial numbers. At the time of issuance, the appropriate details are printed on the form and recorded with reference to the pre-printed serial number. However, this requires bank branches to stock the various types of stationery. Moreover, a person wanting such an instrument is required to visit the bank or other issuer during that issuer's business hours, which can be very inconvenient.

U.S. Pat. No. 8,132,717 to Smith et al. describes an automated teller machine (ATM) that permits a user to print checks for that user's account and then redeem those checks for cash. However, this scheme still requires a purchaser to appear at the ATM, and requires the ATM to stock all the stationery required to print negotiable instruments. As many ATMs fit into small spaces or are free-standing units not associated with bank branches, restocking the stationery can be difficult. U.S. Pat. No. 7,229,011 to Hansen et al. has similar features and limitations. U.S. Publication No. 2002/0055904 by Mon describes a loan machine remote from a loan provider. The loan machine can dispense the proceeds of a loan to a debtor. However, this scheme only dispenses loan proceeds, not amounts of money already belonging to the purchaser of a negotiable instrument. There is, therefore, a continuing need for a way of more conveniently providing negotiable instruments to purchasers.

Reference is made to U.S. Publication No. 2010/0024017 by Ashfield et al., WO 2012/071418 by Krishna, U.S. Publication No. 2011/0047075 by Fourez, U.S. Pat. No. 7,124,113 to Fairclough et al., U.S. Pat. No. 8,186,578 to Block et al., WO 02/060209 by Ogden, and EP 1 696 626 A1 by Clough.

BRIEF DESCRIPTION

According to an aspect, there is provided a method of authorizing a negotiable instrument, the method comprising automatically performing the following steps using a processor: receiving a request for a negotiable instrument, identity data identifying a requester, and a location of a client from which the request originates; retrieving a location range and a known identifier corresponding to the received identity data; if the received first location is within the location range, producing a verification code and transmitting it to the client; selectively receiving a unique identifier, an input code, and a location of a personal mobile device from which the unique identifier is received; determining whether the received input code matches the produced verification code, the received unique identifier matches the retrieved known identifier, and the received second location is within a selected distance of the received first location; and if so, determining a reference code of the negotiable instrument, transmitting the determined reference code to the client, and storing the determined reference code in association with the request in a storage device.

According to another aspect, there is provided a method of performing a financial transaction indicated by a negotiable instrument bearing a reference code, the method comprising automatically performing the following steps using a processor: receiving a reference code of the negotiable instrument; retrieving from a storage device a request corresponding to the received reference code; receiving identifying data of a bearer of the negotiable instrument; determining whether the received identifying data correspond to the retrieved request; and if so, producing a transaction record corresponding to the request and modifying data stored in the storage device to invalidate the reference code.

According to yet another aspect, there is provided a system for producing a negotiable instrument, the system comprising: a host processor and a client processor spaced apart from the host processor and communicatively connected to the host processor; a first location sensor adapted to provide a first location to the client processor; a personal mobile device including a memory storing a unique identifier, a user interface, a second location sensor, and a processor adapted to automatically: receive an input code via the user interface; receive a second location from the second location sensor; and transmit the unique identifier, the input code, and the second location to the host processor; a printer operatively connected to the client processor; wherein the client processor is adapted to automatically: receive a user identity and a request to print a negotiable instrument; receive the first location from the first location sensor; transmit the user identity, the request, and the first location to the host processor; receive a verification code from the host processor; selectively receive a print command from the host processor, the print command including a reference code of the negotiable instrument; and in response to the received print command, operate the printer to produce the negotiable instrument so that the reference code is visible on the negotiable instrument; and the host processor is adapted to automatically: receive the user identity, the request, and the first location from the client processor; retrieve a location range and a known identifier corresponding to the user identity; if the received first location is within the location range, produce the verification code and transmit it to the client processor; selectively receive the unique identifier, the input code, and the second location from the personal mobile device; determine whether the input code matches the produced verification code, the received unique identifier matches the retrieved known identifier, and the received second location is within a selected distance of the received first location; and if so, determine the reference code of the negotiable instrument, produce the print command including the determined reference code, transmit the print command to the client processor, and store the determined reference code in association with the request in a storage device.

Systems and methods of producing negotiable instruments, authorizing negotiable instruments, and performing financial transactions corresponding to negotiable instruments are described herein. Various aspects advantageously permit producing negotiable instruments without specialized stationery, inks (such as magnetic ink), or fonts. Various aspects permit negotiable instruments to be produced outside of normal business hours.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-processing algorithms and systems are well known, the present description will be directed in particular to algorithms and systems forming part of, or cooperating more directly with, systems and methods described herein. Other aspects of such algorithms and systems, and hardware or software for producing and otherwise processing signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 1:
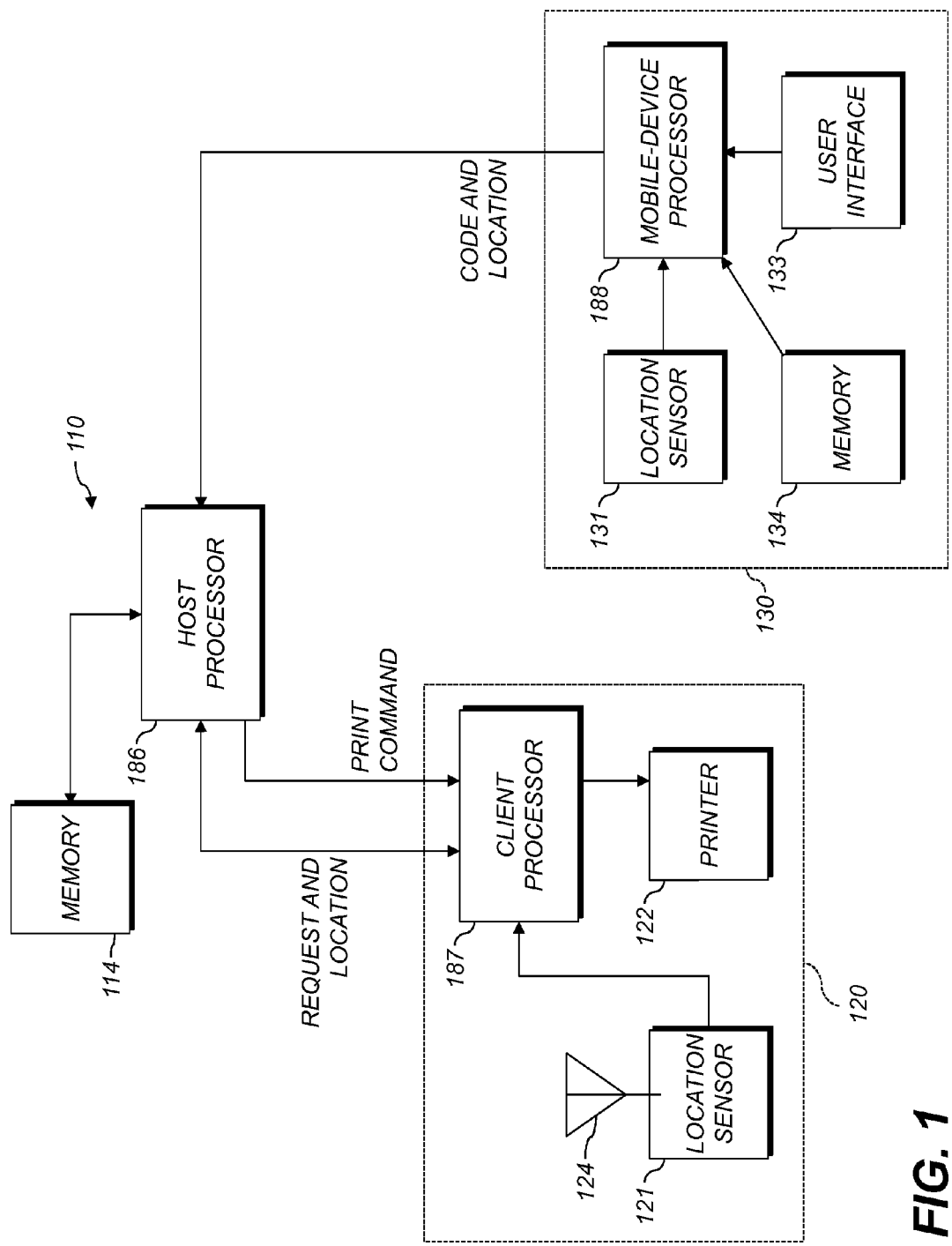
FIG. 1 shows a system for producing a negotiable instrument according to various aspects.

FIG. 1 shows a system for producing a negotiable instrument according to various aspects.

Host system 110 includes host processor 186 and memory 114. Memory 114 can store location ranges and other data, as described below, and can include a database or other nontransient data store. Client system 120 includes client processor 187 spaced apart from host processor 186 and communicatively connected to host processor 186, e.g., through a wired or wireless network or point-to-point communications link. For example, host processor 186 can be located in a machine room of a hosting facility, and client processor 187 can be located in a personal computer in a user's home or office. First location sensor 121 provides a first sensed location to client processor 187, e.g., using signals received via antenna 124. For example, first location sensor 121 can include a Global Positioning System (GPS), Galileo, GLONASS, COMPASS, e-LORAN, or other long-range-positioning-system receiver. First location sensor 121 can also include a receiver for signals from multiple antennas (e.g., cellular telephone towers or television or radio broadcast antennas), a memory storing a location of antennas from which signals are detected, and circuitry or processing resources to triangulate the position of the sensor based on the received signals and the stored locations. First location sensor 121 can be removably or permanently attached to client processor 187, or integrated wholly or partly with client processor 187 in a system-on-chip, system-in-package, or encapsulated circuit-board module.

Client system 120 also includes printer 122 responsive to client processor 187 to print negotiable instruments. The negotiable instruments can be printed on bond paper or any type of paper, and with any type or color of ink, as long as the printed features are legible. Printer 122 can include, e.g., an inkjet, thermal, or electrophotographic printer. Client processor 187 is adapted to receive data from location sensor 121, communicate with host processor 186, and operate printer 122, as described below.

Personal mobile device 130 includes memory 134 storing a unique identifier of device 130 or the user who owns or controls device 130. Personal mobile device 130 can be a cellular telephone, smartphone, wireless tablet, or any portable electronic device that includes a Subscriber Identity Module (SIM card) or a similar device carrying the unique ID. User interface 133 permits a user to input data to personal mobile device 130. Mobile-device processor 188 uses data from location sensor 131, user interface 133, and memory 134, as is described below.

Personal mobile device 130 also includes second location sensor 131, which can include any of the exemplary components described above. First location sensor 121 and second location sensor 122 can use the same position-determining mechanism (e.g., both can include GPS receivers) or different mechanisms (e.g., GPS in sensor 121 and cell-phone-tower triangulation in sensor 131). First location sensor 121 or second location sensor 131 can include epoxy glob-top-encapsulated electronic components or otherwise be hardened or secured against tampering, as can the connections between location sensor 121 and client processor 187, and between location sensor 131 and mobile-device processor 188.

Figure 2A:
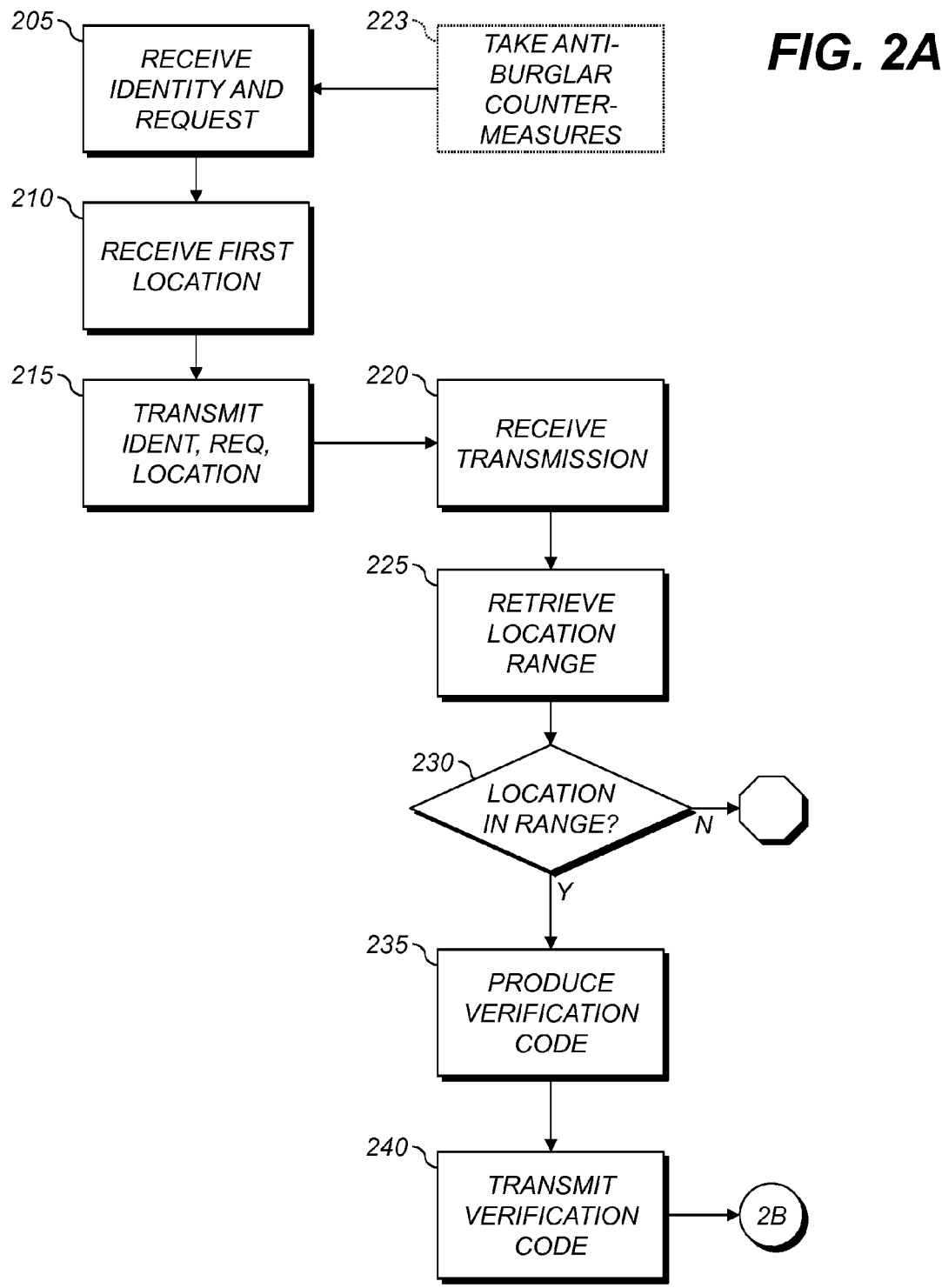
FIGS. 2A-2B show a flowchart of methods of printing a negotiable instrument according to various aspects.
Figure 2B:
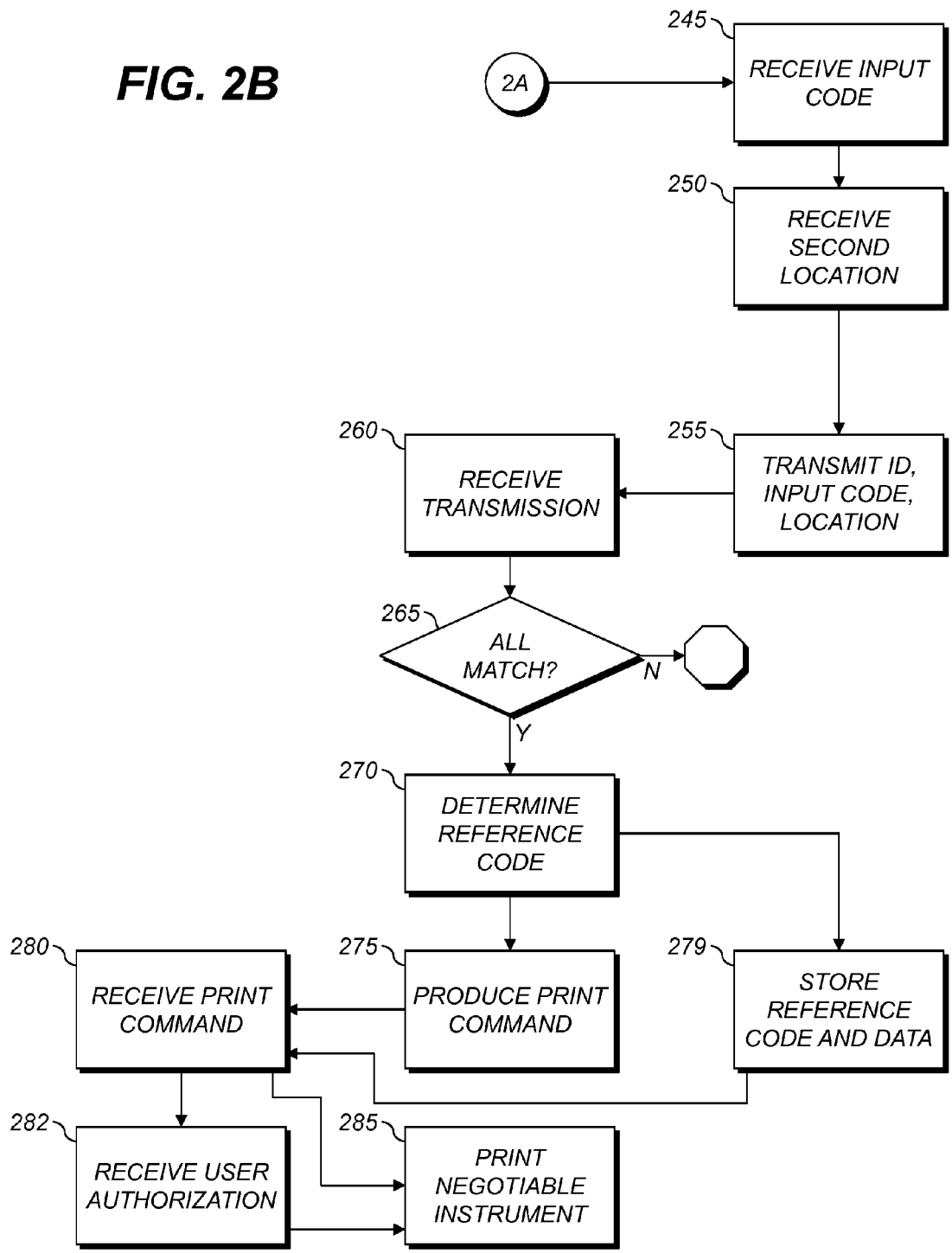

FIGS. 2A-2B show a flowchart of methods of printing a negotiable instrument according to various aspects. These steps can be automatically carried out by processors 186, 187, 188 (all FIG. 1), or by other processors. The steps can be divided in various ways between one or more processor(s). In an aspect, processing begins with step 205.

In step 205, a client processor receives a user identity and a request to print a negotiable instrument. In various aspects, client processor 187 (FIG. 1) is adapted, by programming, wiring, or design, to execute computational steps that will receive the user identity and the request ("adapted to" has this connotation throughout this disclosure when used with reference to a processor such as processors 186, 187, 188; statements that a processor performs a particular function also signify that that processor is adapted to perform that function). Client system 120 can be a standard personal computer and associated peripherals, and the user identity can include, e.g., client-system login information such as a username. The user identity can also include a username typed on a keyboard attached to client processor 187 or otherwise provided to client processor 187. Step 205 is followed by step 210.

In step 210, the client processor receives a first location from a first location sensor such as sensor 121, FIG. 1. This can be substantially equal to the location of client system 120 in a selected coordinate system (e.g., WGS84 latitude, longitude, and elevation). The client processor can execute specialized software, e.g., a JAVA applet or a JAVASCRIPT script, that reads the location from the first location sensor. The location can be read using the W3C Geolocation API, optionally with additional checks to verify that the location is being read from the first location sensor and not from a spoofing routine. For example, the first location sensor (or the second location sensor, and likewise throughout this paragraph) can sign messages carrying location data with a private key, and the client processor can automatically check the signatures using a known public key of the first location sensor. Step 210 is followed by step 215.

In step 215, the client processor transmits the user identity, the request, and the first location to a host processor. These can be transmitted together or separately. For example, in a Web-server hosted aspect, the client processor can transmit the user identity at the time of logon to the Web application. The request and the first location can be transmitted subsequent to application logon. The first location can also be transmitted at the time of application logon. Step 215 is followed by step 220.

In step 220, the user identity, the request, and the first location are received from the client processor, e.g., by a host processor such as host processor 186 (FIG. 1). They can be received via a network connection such as an HTTPS connection. Step 220 is followed by step 225.

In step 225, the host processor automatically retrieves a location range (e.g., an area of latitude/longitude or a volume of latitude/longitude/elevation) and a known identifier corresponding to the user identity. These values can be retrieved from a database, e.g., memory 114. Step 225 is followed by decision step 230.

Decision step 230 decides whether the received first location is within the retrieved location range. If not, processing stops. Throughout this disclosure, whenever processing stops, a message indicating that fact can be transmitted to the client processor or a mobile-device processor. If the received first location is within the location range, the next step is step 235.

In step 235, a verification code is produced. In subsequent step 240, the verification code is transmitted it to the client processor. The client processor can present the received verification code, e.g., visually on screen or audibly using a speech synthesizer. The user can then manually transfer the presented verification code to a personal mobile device (e.g., personal mobile device 130, FIG. 1), e.g., by reading the code off the screen and entering it on a keypad in a user interface (e.g., user interface 133, FIG. 1). Step 240 is followed by step 245.

The verification code is capable of being communicated by humans. For example, the verification code can include symbols commonly used in the written form of the user's native language such as numbers, punctuation symbols, (for alphabetic languages) letters, or (for Japanese) kana or kanji symbols. The verification code can have any number and classification of characters or symbols, e.g., nine digits or seven alphanumeric characters. The verification code can include a pseudorandom number, e.g., a number provided by a cryptographically secure pseudo-random number generator. The verification code can include a sequence number, e.g., incremented every time a request is received. Step 235 can include receiving a user code, e.g., from the user of the client system, and incorporating the user code into the verification code or setting the verification code equal to the user code. For example, step 235 can include prompting the user to enter a telephone number and receiving the entered number as a user code. If the number is 555-1234, the user code can be "5551234". The verification code can be "5551234", or, e.g., "5551234abc". Such verification codes may be more reliably recalled by the user. The verification code can include a check digit, e.g., as International Standard Book Numbers (ISBNs) do.

In step 245, the mobile-device processor (e.g., mobile-device processor 188, FIG. 1) receives an input code via the user interface. The input code can be the verification code. The input code can also differ from the verification code because of unintentional error or because of a fraudulent attempt by a thief to guess the verification code. Step 245 is followed by step 250.

In step 250, the mobile-device processor receives a second location from the second location sensor. The second location can be substantially the location of the personal mobile device. Step 250 is followed by step 255.

In step 255, a unique identifier of the personal mobile device (e.g., from memory 134, FIG. 1), the input code, and the second location are transmitted to the host processor, e.g., by the mobile-device processor. These data can be transmitted, e.g., via cellular data protocols such as cellular digital packet data (CDPD), general packet radio service (GPRS), 1×EV-DO, or Evolved Packet Core (EPC). Step 255 is followed by step 260.

In step 260, the unique identifier, the input code, and the second location are received from the personal mobile device, e.g., by the host processor. The host processor can poll for transmissions or be notified when transmissions arrive. In various aspects, if the input code is received more than a certain amount of time after the verification code was sent to the client processor, processing stops. For example, the code can be required to be entered within five minutes, or another time. The time interval can be set to take into account network delays, as can all time intervals described herein. When a transmission is received, step 260 is followed by decision step 265.

In decision step 265, the host processor determines whether the input code matches the produced verification code (from step 235), the received unique identifier matches the retrieved known identifier (from step 225), and the received second location is within a selected distance of the received first location. If not, processing stops. If the codes and identifiers match, there is a high probability that the client system and the mobile device are both being operated by a single user or several people acting at a single user's direction. If the locations are within the selected distance, e.g., 2 m, 10 m, or 30 m, there is a high probability that the user is in fact at his home or office and making the request. The selected distance can be determined based on the location accuracy of the location service(s) used by the location sensors (e.g., within 20 m for GPS). If the codes match and the locations correspond, the next step is step 270.

In step 270, the host processor determines a reference code of the negotiable instrument. The reference code can be formatted as a standard bank reference number, e.g., a serial check number, or can be formatted as described above for verification codes. A conventional cashier's-check number only identifies the printed document. A reference code can identify the printed negotiable instrument, or the transaction to be carried out when the printed negotiable instrument is presented for redemption. Step 270 is followed by steps 275 and 279.

In step 275, a print command is produced including the determined reference code. In subsequent step 277, the print command is transmitted to the client processor. Step 277 is followed by step 280. In step 279, the determined reference code is stored in association with the request in a storage device, e.g., by the host processor in memory 114 (FIG. 1). Stored information can include the amount, payor, payee, date of the request, time of the request, or validity period of the negotiable instrument (e.g., "not valid after 90 days"). Step 279 is followed by step 280.

In step 280, the client processor receives the print command from the host processor, the print command including the reference code of the negotiable instrument. Step 280 is followed by step 282 or step 285. In step 282, the client processor receives a user authorization to print the negotiable instrument. Step 282 is followed by step 285. If the user authorization is not received within a certain time (e.g., fifteen minutes) of the time the print command was received (or, alternatively, within the certain time of the time the request was sent), the negotiable instrument becomes void. The client processor can transmit an indication to the host processor that the user authorization was received, and the host processor can void the negotiable instrument if the indication is not received within a selected time. Alternatively, the client processor can measure the time intervals and transmit a voiding command to the host processor if the user authorization is not received within a selected time. To void an instrument, the host processor can remove the stored data for that instrument, or can record an indication that the instrument is void in association with that stored data.

In step 285, in response to the received print command, the client processor operates the printer to produce the negotiable instrument so that the reference code is visible on the negotiable instrument. In various aspects, there is a fifteen-minute time limit for printing once the image of the document is received, and the print command is received from a user, as described with reference to step 282.

In various aspects, the print command can be emailed to the user or provided in other ways. The print command can include the reference code of the negotiable instrument or the reference code and an image of the negotiable instrument. This permits transmitting negotiable instruments electronically rather than on paper.

Various aspects described herein advantageously reduce the probability of fraudulent printing of negotiable instruments drawn against a user's account by a thief who is not the user. Verification of the first location in step 230 reduces the probability that a thief will be able to crack the host processor's software, log on as the user from a remote location of the thief s choice, and submit requests to print negotiable instruments. Since the thief is not at the user's location in this scenario, decision step 230 will stop processing.

Verification of the input code against the verification code in step 265 reduces the probability that a burglar in the user's home will be able to issue requests as the user from the user's computer. If the user has his personal mobile device with him and is away from home, the burglar will not be able to transmit the input code at all, or within the selected time limit. Moreover, the transmission of the unique identifier from the personal mobile device restricts the burglar from using his own personal mobile device to transmit the input code. The verification of the second location against the first location restricts the burglar from using an accomplice to threaten the user when he is away from home into entering the input code. The user can do so knowing that processing will still stop since the locations do not match. If the user's house is burgled and the user is home, the user or a security system can reduce the probability of fraudulent printing of negotiable instruments by taking conventional countermeasures (step 223), e.g., sounding a burglar alarm. Once the burglar has been removed as a threat, step 223 can be followed by step 205.

Figure 3:
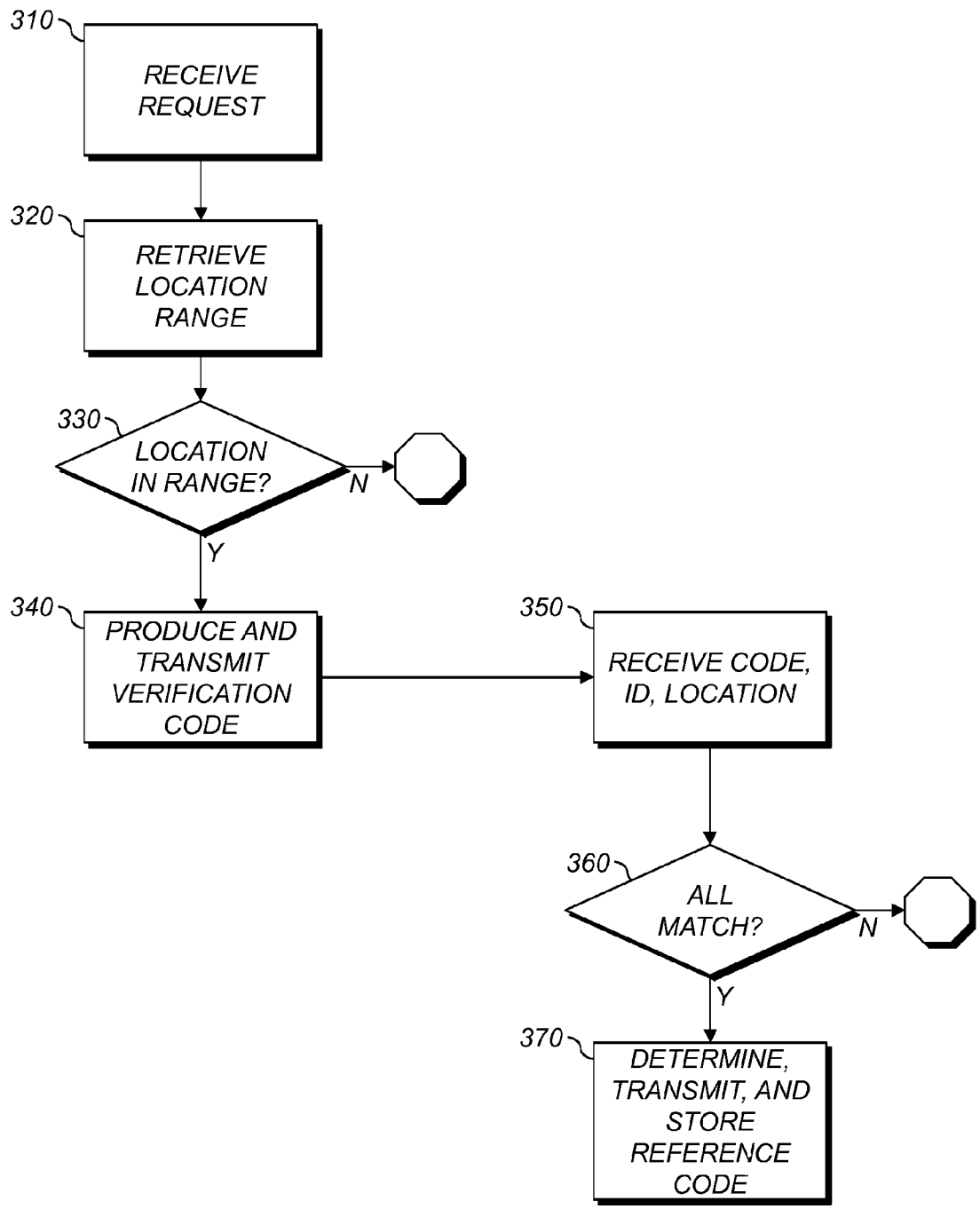
FIG. 3 shows methods of authorizing negotiable instruments according to various aspects.

FIG. 3 shows methods of authorizing negotiable instruments according to various aspects. The steps of this method can be automatically carried out using a processor, e.g., host processor 186 (FIG. 1). In step 310, a request for a negotiable instrument is received, as are identity data identifying a requester and a location of a client from which the request originates. In step 320, a location range and a known identifier corresponding to the received identity data are retrieved. In decision step 330, it is determined whether the received first location is within the location range. If so, the next step is step 340, in which a verification code is produced and transmitted to the client. In step 350, a unique identifier, an input code, and a location of a personal mobile device from which the unique identifier is received are selectively received. In decision step 360, it is determined whether the received input code matches the produced verification code, the received unique identifier matches the retrieved known identifier, and the received second location is within a selected distance of the received first location. If so, the next step is step 370, in which a reference code of the negotiable instrument is determined, the determined reference code is transmitted to the client, and the determined reference code is stored in association with the request in a storage device. Examples of all these steps are given above with reference to FIGS. 2A-2B.

Figure 4:
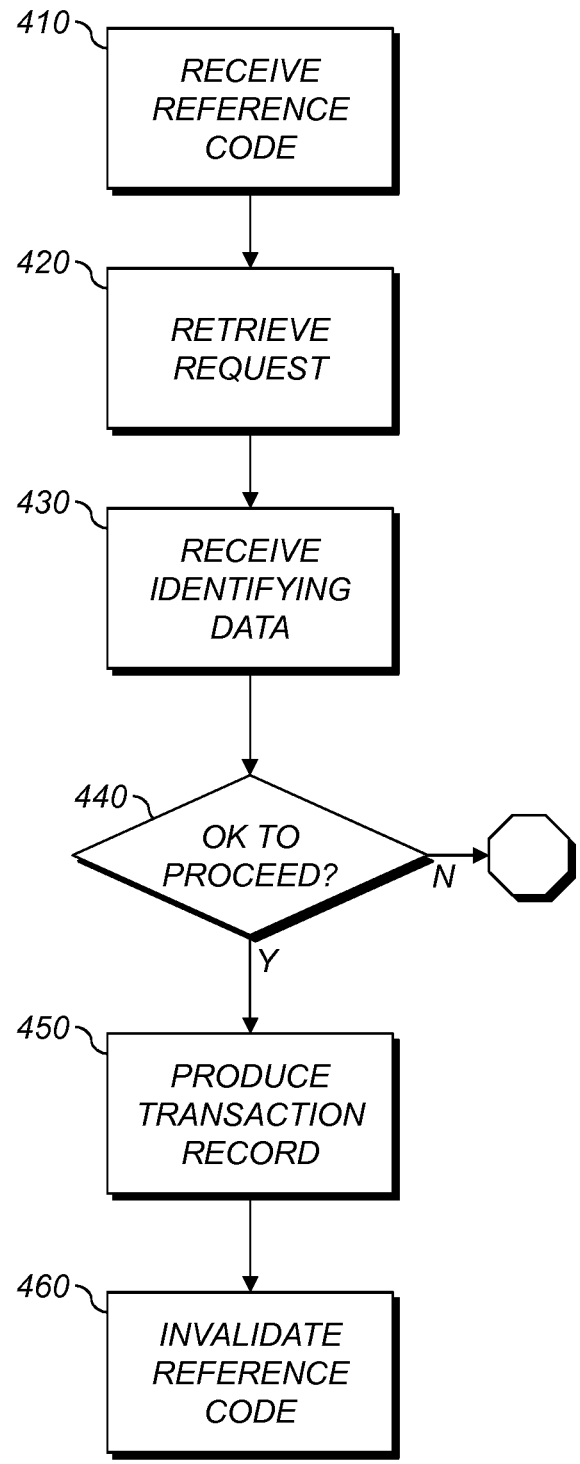
FIG. 4 shows methods of performing a financial transaction indicated by a negotiable instrument bearing a reference code according to various aspects.

FIG. 4 shows methods of performing a financial transaction indicated by a negotiable instrument bearing a reference code according to various aspects. The steps of this method can be automatically carried out using a processor, e.g., host processor 186 (FIG. 1) or a processor located at a bank branch. In step 410, a reference code of the negotiable instrument is received. In step 420, a request corresponding to the received reference code is retrieved from a storage device. In step 430, identifying data of a bearer of the negotiable instrument are received. For example, a bank teller can ask for the bearer's photo identification card (photo ID) and enter the name or number on that identification card into a terminal that provides that information to the processor. In decision step 440, it is determined whether the received identifying data correspond to the retrieved request. For example, the host processor can compare the recipient name indicated in the retrieve request with the received bearer's name from his photo ID. In decision step 440, it can also be determined whether the request is valid, e.g., whether a request was indeed retrieved for the given reference number, whether that request has not been voided or invalidated, or whether there are funds available to satisfy the request. If so, the next step is step 450, in which a transaction record corresponding to the request is produced. For example, the transaction record can be an Automated Clearing House (ACH) electronic money-transfer request. In step 460, data stored in the storage device are modified to invalidate the reference code. This can be done as described above for voiding.

Figure 5:
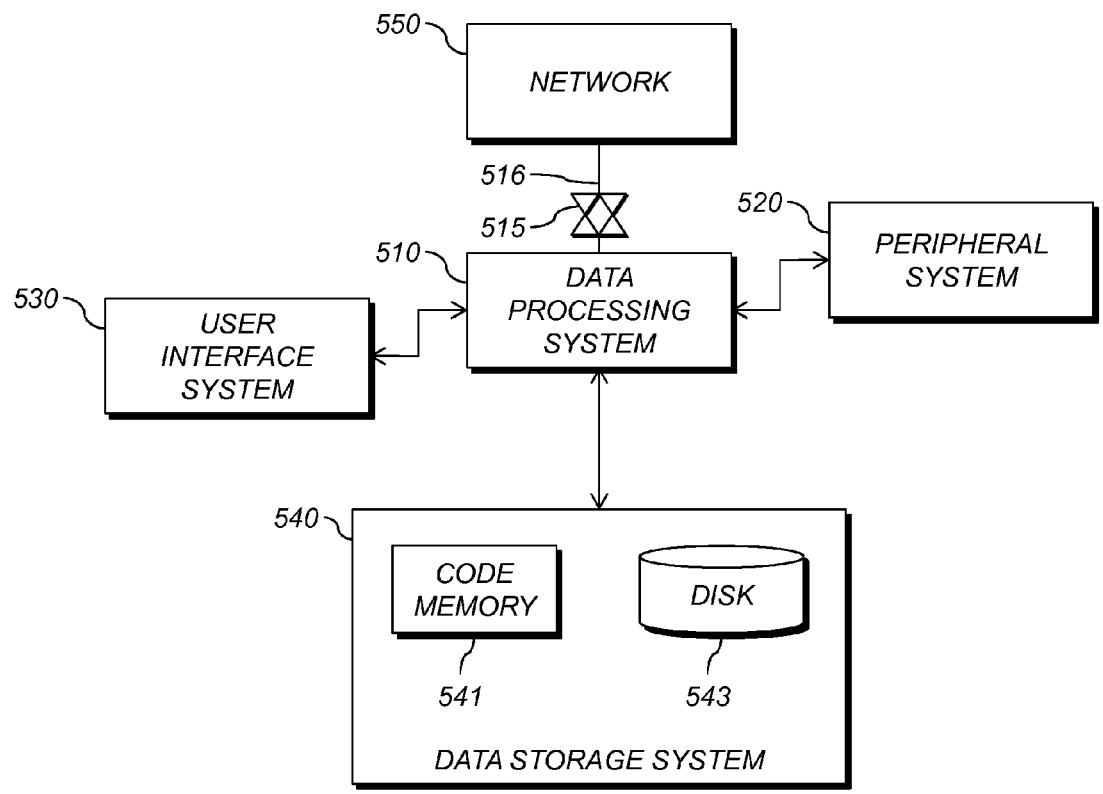
FIG. 5 is a high-level diagram showing the components of a data-processing system.

FIG. 5 is a high-level diagram showing the components of a data-processing system for analyzing data and performing other analyses described herein. The system includes a data processing system 510, a peripheral system 520, a user interface system 530, and a data storage system 540. The peripheral system 520, the user interface system 530 and the data storage system 540 are communicatively connected to the data processing system 510. Processors 186, 187, 188, and other processors described herein, can each include one or more of systems 510, 520, 530, 540.

The data processing system 510 includes one or more data processing devices that implement the processes of the various aspects, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 540 includes one or more processor-accessible memories configured to store information, including the information needed to execute the processes of the various aspects, including the example processes described herein. The data storage system 540 can be a distributed processor-accessible memory system including multiple processor-accessible memories communicatively connected to the data processing system 510 via a plurality of computers or devices. On the other hand, the data storage system 540 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors. In this regard, although the data storage system 540 is shown separately from the data processing system 510, one skilled in the art will appreciate that the data storage system 540 can be stored completely or partially within the data processing system 510. Further in this regard, although the peripheral system 520 and the user interface system 530 are shown separately from the data processing system 510, one skilled in the art will appreciate that one or both of such systems can be stored completely or partially within the data processing system 510.

The peripheral system 520 can include one or more devices configured to provide digital content records to the data processing system 510. For example, the peripheral system 520 can include digital still cameras, digital video cameras, cellular phones, or other data processors. The data processing system 510, upon receipt of digital content records from a device in the peripheral system 520, can store such digital content records in the data storage system 540.

The user interface system 530 can include a mouse, a keyboard, another computer, or any device or combination of devices from which data is input to the data processing system 510. In this regard, although the peripheral system 520 is shown separately from the user interface system 530, the peripheral system 520 can be included as part of the user interface system 530.

The user interface system 530 also can include a display device, a processor-accessible memory, or any device or combination of devices to which data is output by the data processing system 510. In this regard, if the user interface system 530 includes a processor-accessible memory, such memory can be part of the data storage system 540 even though the user interface system 530 and the data storage system 540 are shown separately in FIG. 9.

In view of the foregoing, aspects of the invention provide ways of printing negotiable instruments without special paper forms or special inks, without any limitation to printing negotiable instruments only during business hours. A technical effect is to print a negotiable instrument that is in fact redeemable for cash. Each of processors 186, 187, 188 (FIG. 1) can include a data processing system 510 and include or be operatively connected to one or more of each of systems 520, 530, or 540. For example, client system 120 (FIG. 1) can include a user interface for receiving information from the person wishing to print a negotiable instrument.

As will be appreciated by one skilled in the art, aspects of the present invention may be embodied as a system, method, or computer program product. Accordingly, aspects of the present invention may take the form of an entirely hardware aspect, an entirely software aspect (including firmware, resident software, micro-code, etc.), or an aspect combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice method(s) according to various aspect(s).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, or any suitable combination of appropriate media.

Computer program code for carrying out operations for aspects of the present invention may be written in any combination of one or more programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The user's computer or the remote computer can be non-portable computers, such as conventional desktop personal computers (PCs), or can be portable computers such as tablets, cellular telephones, smartphones, or laptops.

Computer program instructions can be stored in a computer readable medium that can direct a computer, other programmable data processing apparatus, or other devices to function in a particular manner. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The invention is inclusive of combinations of the aspects described herein. References to "a particular aspect" and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

PARTS LIST 110 host system
114 memory
120 client system
121 first location sensor
122 printer
124 antenna
130 personal mobile device
131 second location sensor
133 user interface
134 memory
186 host processor
187 client processor
188 mobile-device processor
205, 210, 215, 220, 223, 225 steps
230 decision step
235, 240, 245, 250, 255, 260 steps
265 decision step
270, 275, 277, 279, 280, 282 steps
285, 310, 320 steps
330 decision step
340, 350 steps
360 decision step
370, 410, 420, 430, 440, 450 steps
460 step
510 data processing system
520 peripheral system
530 user interface system
540 data storage system

The invention claimed is:

1. A method of authorizing a negotiable instrument, the method comprising automatically performing the following steps using a host processor:
   receiving a request for a negotiable instrument from a client processor, the request including identity data identifying a requester, and a first location of a client from which the request originates, the first location being obtained from a first location sensor;
   retrieving a first location range and a known identifier corresponding to the received identity data;
   determining, if the received first location is within the first location range, and if the received first location is within the retrieved first location range, then producing a verification code and transmitting the verification code to the client processor;
   prompting the client to enter an input code into a personal mobile device and transmitting a unique identifier of the personal mobile device, the input code, and a location of the personal mobile device to the host processor, as determined by a second location sensor;
   using the host processor, determining whether the received input code matches the produced verification code, the received unique identifier matches a stored known identifier, and a received second location as determined by the second location sensor is within a selected distance of the received first location; and
   if the code and identifier match and the second location is within the selected distance of the first location, determining a reference code of the negotiable instrument, transmitting the determined reference code to the client processor, and storing the determined reference code in association with the request in a storage device.

2. A system for producing a negotiable instrument, the system comprising:
   a) a host processor;
   b) a client processor spaced apart from the host processor and communicatively connected to the host processor;
   c) a first location sensor adapted to provide a first location to the client processor;
   d) a personal mobile device including a memory storing a unique identifier, a user interface, a second location sensor, and a processor adapted to automatically:
      receive an input code via the user interface;
      receive a second location from the second location sensor; and
      transmit the unique identifier, the input code, and the second location to the host processor;
   e) a printer operatively connected to the client processor;
   f) wherein the client processor is adapted to automatically:
      receive a user identity and a request to print a negotiable instrument;
      receive the first location from the first location sensor;
      transmit the user identity, the request, and the first location to the host processor;
      receive a verification code from the host processor;
      selectively receive a print command from the host processor, the print command including a reference code of the negotiable instrument; and in response to the received print command, operate the printer to produce the negotiable instrument so that the reference code is visible on the negotiable instrument;

g) and wherein the host processor is adapted to automatically:
   receive the user identity, the request, and the first location from the client processor;
   retrieve a location range and a known identifier corresponding to the user identity;
   if the received first location is within the location range, produce the verification code and transmit it to the client processor;
   selectively receive the unique identifier, the input code, and the second location from the personal mobile device;
   determine whether the input code matches the produced verification code, the received unique identifier matches the retrieved known identifier, and the received second location is within a selected distance of the received first location; and
   if so, determine the reference code of the negotiable instrument, produce the print command including the determined reference code, transmit the print command to the client processor, and store the determined reference code in association with the request in a storage device.

3. The method as recited in claim 1, wherein the input code and the verification code are the same.

4. The method as recited in claim 1, including the step of prompting the client to enter a telephone number into the personal mobile device, wherein the phone number is the input code.

5. The method as recited in claim 1, wherein the request, user identity and first location are transmitted to the host processor by a client processor and in which the verification code is transmitted from the host processor to the client processor.

6. The method as recited in claim 1, wherein the verification code comprises at least one or more of a pseudorandom number, a sequence number, and a check digit.

7. A non-transitory computer-readable medium for authorizing a negotiable instrument, wherein the medium is configured to:
   receive a request for a negotiable instrument from a client processor, the request including identity data identifying a requester, and a first location of a client from which the request originates, the first location being obtained from a first location sensor;
   retrieve a first location range and a known identifier corresponding to the received identity data;
   determine, if the received first location is within the first location range, and if the received first location is within the retrieved first location range, then produce a verification code and transmitting the verification code to the client processor;
   prompt the client to enter an input code into a personal mobile device and transmit a unique identifier of the personal mobile device, the input code, and a location of the personal mobile device to the host processor, as determined by a second location sensor;
   using the host processor, determine whether the received input code matches the produced verification code, the received unique identifier matches a stored known identifier, and a received second location as determined by the second location sensor is within a selected distance of the received first location; and
   if the code and identifier match and the second location is within the selected distance of the first location, determine a reference code of the negotiable instrument, transmit the determined reference code to the client processor, and store the determined reference code in association with the request in a storage device.

* * * * *